US009315714B2

(12) United States Patent
Sanders et al.

(10) Patent No.: US 9,315,714 B2
(45) Date of Patent: Apr. 19, 2016

(54) DEGRADABLE NON-AQUEOUS GEL SYSTEMS

(75) Inventors: Mark Sanders, Banchory (GB); David Antony Ballard, Stonehaven (GB); Arvind D. Patel, Sugar Land, TX (US); Jason T. Scorsone, Houston, TX (US)

(73) Assignees: M-I L.L.C., Houston, TX (US); M-I Drilling Fluids U.K. Limited, Aberdeenshire, Scotland (GB)

( * ) Notice: Subject to any disclaimer, the term of this patent is extended or adjusted under 35 U.S.C. 154(b) by 116 days.

(21) Appl. No.: 12/863,049

(22) PCT Filed: Jan. 15, 2009

(86) PCT No.: PCT/US2009/031133
§ 371 (c)(1),
(2), (4) Date: Jul. 15, 2010

(87) PCT Pub. No.: WO2009/091909
PCT Pub. Date: Jul. 23, 2009

(65) Prior Publication Data
US 2011/0053809 A1 Mar. 3, 2011

Related U.S. Application Data

(60) Provisional application No. 61/022,182, filed on Jan. 18, 2008.

(51) Int. Cl.
| | |
|---|---|
| C09K 8/24 | (2006.01) |
| C09K 8/02 | (2006.01) |
| C09K 8/22 | (2006.01) |
| C09K 8/54 | (2006.01) |
| C09K 8/32 | (2006.01) |
| C09K 8/34 | (2006.01) |
| C09K 8/00 | (2006.01) |
| C09K 8/524 | (2006.01) |
| C09K 8/60 | (2006.01) |
| E21B 43/26 | (2006.01) |
| C09K 8/50 | (2006.01) |
| C09K 8/516 | (2006.01) |

(52) U.S. Cl.
CPC . *C09K 8/50* (2013.01); *C09K 8/516* (2013.01); *C09K 2208/26* (2013.01)

(58) Field of Classification Search
CPC ............ C09K 8/035; C09K 8/24; C09K 8/80; C09K 8/05; C09K 8/34; C09K 8/32; C09K 8/487; C09K 8/502; C09K 8/506; C09K 8/5086; C09K 8/516; C09K 8/68; C09K 8/82; C09K 8/86; C09K 8/885
USPC ......... 507/117, 100, 103, 140, 142, 127, 130, 507/136, 139, 239, 249, 261, 266, 267; 166/305.1
See application file for complete search history.

(56) References Cited

U.S. PATENT DOCUMENTS

| | | | |
|---|---|---|---|
| 3,181,612 A * | 5/1965 | West et al. | 166/283 |
| 4,148,772 A | 4/1979 | Marchetti et al. | |
| 4,498,994 A * | 2/1985 | Heilweil | 507/120 |
| 4,637,956 A | 1/1987 | Das et al. | |
| 4,746,754 A | 5/1988 | Otterbacher et al. | |
| 4,767,829 A | 8/1988 | Kordomenos et al. | |
| 4,870,141 A | 9/1989 | Kordomenos | |
| 4,976,833 A | 12/1990 | Debroy et al. | |
| 5,108,458 A | 4/1992 | Marumoto et al. | |
| 5,453,536 A | 9/1995 | Dai et al. | |
| 5,559,064 A | 9/1996 | Tsuchinari et al. | |
| 5,663,123 A | 9/1997 | Goodhue, Jr. et al. | |
| 5,846,915 A | 12/1998 | Smith et al. | |
| 6,288,176 B1 | 9/2001 | Hsieh et al. | |
| 6,579,947 B2 | 6/2003 | Heitz et al. | |
| 6,861,394 B2 | 3/2005 | Ballard et al. | |
| 7,157,527 B2 | 1/2007 | Kuntimaddi et al. | |
| 7,314,850 B2 | 1/2008 | Taylor et al. | |
| 7,717,180 B2 * | 5/2010 | Badalamenti et al. | 166/292 |
| 7,858,561 B2 | 12/2010 | Abad et al. | |
| 2002/0028932 A1 | 3/2002 | Loontjens et al. | |
| 2003/0004282 A1 | 1/2003 | Kamikado et al. | |
| 2003/0194635 A1 | 10/2003 | Mulligan | |
| 2004/0236021 A1 | 11/2004 | Faecke et al. | |
| 2005/0187314 A1 | 8/2005 | Anderson et al. | |
| 2005/0261138 A1 | 11/2005 | Robb et al. | |
| 2006/0003900 A1 | 1/2006 | Hanes | |

(Continued)

FOREIGN PATENT DOCUMENTS

| | | |
|---|---|---|
| EP | 2247702 A2 | 11/2010 |
| WO | 2006/075154 A1 | 7/2006 |

OTHER PUBLICATIONS

Extended European Search Report issued in corresponding European Application No. 09702574.6 dated Oct. 31, 2011 (7 pages).
Office Action issued in corresponding Canadian Application No. 2,712,270 dated Nov. 10, 2011 (3 pages).
International Search Report from PCT/US2009/031133 dated Sep. 7, 2009 (6 pages).
Written Opinion from PCT/US2009/031133 dated Sep. 7, 2009 (6 pages).
Office Action (w/translation) issued Oct. 4, 2012 in corresponding Eurasian application No. 201070862/13 (2 pages).
Examiner's Report issued in corresponding Canadian Patent Application No. 2712270 dated Jun. 20, 2012 (3 pages).

(Continued)

*Primary Examiner* — Aiqun Li
(74) *Attorney, Agent, or Firm* — Osha • Liang LLP

(57) ABSTRACT

A method of treating a formation that includes exposing a region of the formation occupied by a hydrolysable gel to a hydrolyzing agent; and allowing sufficient time for the hydrolyzing agent to hydrolyze the gel. Various methods may also include the use of a swelling agent to allow for expansion of the gel.

22 Claims, No Drawings

(56) References Cited

U.S. PATENT DOCUMENTS

| | | |
|---|---|---|
| 2006/0122357 A1 | 6/2006 | Faecke et al. |
| 2006/0148391 A1 | 7/2006 | Ono et al. |
| 2006/0281854 A1 | 12/2006 | Imamura et al. |
| 2007/0009750 A1 | 1/2007 | Ito et al. |
| 2007/0023288 A1 | 2/2007 | Kuwano et al. |
| 2007/0032386 A1 | 2/2007 | Abad et al. |
| 2008/0017376 A1 | 1/2008 | Badalamenti et al. |
| 2010/0087566 A1 | 4/2010 | Ballard |
| 2010/0120944 A1 | 5/2010 | Ballard |

OTHER PUBLICATIONS

Communication Pursuant to Article 94(3) EPC issued Dec. 19, 2012 in corresponding European application No. 09 702 574.6 (5 pages).

Office Action issued in corresponding Mexican Application No. MX/a/2010/007771, mailed Apr. 21, 2014, with English communication reporting the same (5 pages).

Correspondence reporting Office Action issued Jun. 16, 2014 in corresponding Argentine application No. AR 070203 (4 pages).

* cited by examiner

DEGRADABLE NON-AQUEOUS GEL SYSTEMS

BACKGROUND OF INVENTION

1. Field of the Invention

Embodiments disclosed herein relate generally to chemically degradable gels and breaker systems for degrading gels formed downhole.

2. Background Art

Lost circulation is a recurring drilling problem, characterized by loss of drilling mud into downhole formations that are fractured, highly permeable, porous, cavernous, or vugular. These earth formations can include shale, sands, gravel, shell beds, reef deposits, limestone, dolomite, and chalk, among others. Other problems encountered while drilling and producing oil and gas include stuck pipe, hole collapse, loss of well control, and loss of or decreased production.

Induced mud losses may also occur when the mud weight, required for well control and to maintain a stable wellbore, exceeds the fracture resistance of the formations. A particularly challenging situation arises in depleted reservoirs, in which the drop in pore pressure weakens hydrocarbon-bearing rocks, but neighboring or inter-bedded low permeability rocks, such as shales, maintain their pore pressure. This can make the drilling of certain depleted zones impossible because the mud weight required to support the shale exceeds the fracture resistance of the sands and silts.

Other situations arise in which isolation of certain zones within a formation may be beneficial. For example, one method to increase the production of a well is to perforate the well in a number of different locations, either in the same hydrocarbon bearing zone or in different hydrocarbon bearing zones, and thereby increase the flow of hydrocarbons into the well. The problem associated with producing from a well in this manner relates to the control of the flow of fluids from the well and to the management of the reservoir. For example, in a well producing from a number of separate zones (or from laterals in a multilateral well) in which one zone has a higher pressure than another zone, the higher pressure zone may disembogue into the lower pressure zone rather than to the surface. Similarly, in a horizontal well that extends through a single zone, perforations near the "heel" of the well, i.e., nearer the surface, may begin to produce water before those perforations near the "toe" of the well. The production of water near the heel reduces the overall production from the well.

During the drilling process muds are circulated downhole to remove rock as well as deliver agents to combat the variety of issues described above. Mud compositions may be water or oil-based (including mineral oil, biological, diesel, or synthetic oils) and may comprise weighting agents, surfactants, proppants, and gels. In attempting to cure these and other problems, crosslinkable or absorbing polymers, loss control material (LCM) pills, and cement squeezes have been employed. Gels, in particular, have found utility in preventing mud loss, stabilizing and strengthening the wellbore, and zone isolation and water shutoff treatments.

In attempting to cure these and other problems, crosslinkable or absorbing polymers, loss control material (LCM) pills, and cement squeezes have been employed, each of which may include materials such as lignins and lignosulfonates, as well as lignin and lignosulfonate gels.

In many wells, water-based and oil-based muds are both used. Water-based muds are generally used early in the drilling process. Later, oil-based muds are substituted as the well gets deeper and reaches the limit of the water-based muds due to limitations such as lubricity and well bore stabilization. The majority of gels employ water compatible gelling and crosslinking agents. There is, however, a dearth of methods using non-aqueous gels which are compatible with oil-based muds.

Further, while there have been an increasing number of developments in gel technology for use downhole, stable gels that may subsequently be chemically degraded by application of a breaker system may find use in situations where a gel has been misplaced or needs subsequent removal from the formation.

Accordingly, there exists a continuing need for developments in gel technology and means for chemically degrading gels formed downhole.

SUMMARY OF INVENTION

In one aspect, embodiments disclosed herein relate to a method of treating a formation that includes exposing a region of the formation occupied by a hydrolysable gel to a hydrolyzing agent; and allowing sufficient time for the hydrolyzing agent to hydrolyze the gel.

In another aspect, embodiments disclosed herein relate to a method of treating a formation that includes emplacing a gelling fluid comprising an internal hydrolyzing agent into the formation; allowing the gelling fluid to gel in a region of the formation; and activating the internal hydrolyzing agent to break the formed gel.

In yet another aspect, embodiments disclosed herein relate to a method of treating a formation that includes emplacing a swelling agent into a region of the formation occupied by a hydrolysable gel; allowing the gel structure to expand; emplacing a hydrolyzing agent into the region of the formation occupied by the gel; and allowing sufficient time for the hydrolyzing agent to hydrolyze the expanded gel.

Other aspects and advantages of the invention will be apparent from the following description and the appended claims.

DETAILED DESCRIPTION

In one aspect, embodiments disclosed herein relate to chemically degradable non-aqueous gels and breaker systems for degrading gels formed downhole. In other aspects, embodiments disclosed herein relate to methods of treating formations occupied by a sealing gel.

Chemically Degradable Gels

Gels of the present disclosure may include non-aqueous, hydrolysable gels. As used herein, "hydrolysable gel" refers to a gel is chemically degradable via hydrolysis of at least one hydrolysable bond contained within the gel. As known in the art, "hydrolysable," "hydrolysis," and the like refer to the ability of water to chemically react with a substance to form two or more new substances by ionization of the water molecule as well as splitting of the compound being hydrolyzed, e.g., an ester group of a polyester is hydrolyzed into the corresponding carboxylic acid and alcohol. The hydrolysable gels may include acid-hydrolysable and base-hydrolysable compounds such that the hydrolysis of the bond is initiated or catalyzed by an acidic or basic material, respectively. Some compounds may be both acid- and base-hydrolysable, which includes a single bond being both acid- or base-hydrolysable or multiple bonds within a polymer being acid- and base-hydrolysable. Further, such hydrolysable bonds may be present in the linear portions of the polymer chain (i.e., internal groups) or may be pendant to the polymer chain. Such types of hydrolysable bonds include, for example, ester, amide, urethane, urea, anhydride, carbamate, carbonate, iminocarbonate, siloxane, sulfate, and phosphate bonds.

In accordance with the present disclosure, the gels used to treat earth formations may include at least one hydrolysable bond as described above, so that once it is no longer necessary, the gel may be chemically degraded and removed from the formation. U.S. Patent Application Nos. 60/914,604 and 60/942,346, which are assigned to the present assignee and herein incorporated by reference in their entirety, discuss the use of various non-aqueous gels used in wellbore treatment applications which are among the hydrolysable gels used in the present application.

In particular embodiments, the hydrolysable gel may include at least one of polyurethanes, silylated polyurethanes, polyureas, and polyesters, in which at least one hydrolysable bond is present along the polymer backbone. In other embodiments, the hydrolysable gel may include at least one siloxane bond, such as in a silicone gel or a crosslinked product of a silane-terminated pre-polymer (including polyurethanes, polyesters, and polyethers).

Polyurethane Gels

In a particular embodiment, the gel may be a polyurethane-based gel. Polyurethanes are typically produced by the polyaddition reaction of a polyisocyanate with a polyalcohol (polyol). A polyisocyanate is a molecule containing two or more isocyanate functional groups, $R—(N=C=O)_{n\geq 2}$, and a polyol is a molecule having two or more hydroxyl functional groups, $R'—(OH)_{n\geq 2}$. The reaction product is a polymer containing the urethane linkage, —RNHCOOR'—, formed by the reaction between an isocyanate group and a hydroxyl group.

Aliphatic polyols useful in preparing polyurethane gels may have a molecular weight of 62 up to 2000 and include, for example, monomeric and polymeric polyols having two or more hydroxyl groups. Examples of the monomeric polyols include ethylene glycol, propylene glycol, butylene glycol, hexamethylene glycol, cyclohexamethylenediol 1,1,1-trimethylolpropane, pentaerythritol, and the like. Examples of polymeric polyols include the polyoxyalkylene polyols (i.e., the diols, triols, and tetrols), the polyester diols, triols, and tetrols of organic dicarboxylic acids and polyhydric alcohols, and the polylactone diols, triols, and tetrols having a molecular weight of 106 to about 2000. Other examples of suitable polyols include: glycerine monoalkanoates (e.g., glycerine monostearates); dimer fatty alcohols; diethylene glycol; triethylene glycol; tetraethylene glycol; 1,4-dimethylolcyclohexane; dodecanediol; bisphenol-A; hydrogenated bisphenol A; 1,3-hexanediol; 1,3-octanediol; 1,3-decanediol; 3-methyl-1,5-pentanediol; 3,3-dimethyl-1,2-butanediol; 2-methyl-1,3-pentanediol; 2-methyl-2,4-pentanediol; 3-hydroxymethyl-4-heptanol; 2-hydroxymethyl-2,3-dimethyl-1-pentanol; glycerine; trimethylol ethane; trimethylol propane; trimerized fatty alcohols; isomeric hexanetriols; sorbitol; pentaerythritol; di- and/or tri-methylolpropane; di-pentaerythritol; diglycerine; 2,3-butenediol; trimethylol propane monoallylether; fumaric and/or maleinic acid containing polyesters; 4,8-bis-(hydroxymethyl)-tricyclo[5,2,0(2,6)]-decane long chain alcohols. Suitable hydroxy-functional esters may be prepared by the addition of the above-mentioned polyols with epsilon-caprolactone or reacted in a condensation reaction with an aromatic or aliphatic diacid. These polyols may be reacted with any of the isocyanates described above.

Isocyanates useful in embodiments disclosed herein may include isocyanates, polyisocyanates, and isocyanate pre-polymers. Suitable polyisocyanates include any of the known aliphatic, alicyclic, cycloaliphatic, araliphatic, and aromatic di- and/or polyisocyanates. Inclusive of these isocyanates are variants such as uretdiones, biurets, allophanates, isocyanurates, carbodiimides, and carbamates, among others.

Aliphatic polyisocyanates may include hexamethylene diisocyanate, trimethylhexamethylene diisocyanate, dimeric acid diisocyanate, lysine diisocyanate and the like, and biuret-type adducts and isocyanurate ring adducts of these polyisocyanates. Alicyclic diisocyanates may include isophorone diisocyanate, 4,4'-methylenebis(cyclohexylisocyanate), methylcyclohexane-2,4- or -2,6-diisocyanate, 1,3- or 1,4-di(isocyanatomethyl)cyclohexane, 1,4-cyclohexane diisocyanate, 1,3-cyclopentane diisocyanate, 1,2-cyclohexane diisocyanate, and the like, and biuret-type adducts and isocyanurate ring adducts of these polyisocyanate. Aromatic diisocyanate compounds may include xylylene diisocyanate, metaxylylene diisocyanate, tetramethylxylylene diisocyanate, tolylene diisocyanate, 4,4'-diphenylmethane diisocyanate, 1,5-naphthalene diisocyanate, 1,4-naphthalene diisocyanate, 4,4'-toluydine diisocyanate, 4,4'-diphenyl ether diisocyanate, m- or p-phenylene diisocyanate, 4,4'-biphenylene diisocyanate, 3,3'-dimethyl-4,4'-biphenylene diisocyanate, bis(4-isocyanatophenyl)-sulfone, isopropylidenebis (4-phenylisocyanate), and the like, and biuret type adducts and isocyanurate ring adducts of these polyisocyanates. Polyisocyanates having three or more isocyanate groups per molecule may include, for example, triphenylmethane-4,4',4"-triisocyanate, 1,3,5-triisocyanato-benzene, 2,4,6-triisocyanatotoluene, 4,4'-dimethyldiphenylmethane-2,2',5,5'-tetraisocyanate, and the like, biuret type adducts and isocyanurate ring adducts of these polyisocyanates. Additionally, isocyanate compounds used herein may include urethanation adducts formed by reacting hydroxyl groups of polyols such as ethylene glycol, propylene glycol, 1,4-butylene glycol, dimethylolpropionic acid, polyalkylene glycol, trimethylolpropane, hexanetriol, and the like with the polyisocyanate compounds, and biuret type adducts and isocyanurate ring adducts of these polyisocyanates.

Other isocyanate compounds may include tetramethylene diisocyanate, toluene diisocyanate, hydrogenated diphenylmethane diisocyanate, hydrogenated xylylene diisocyanate, and trimers of these isocyanate compounds; terminal isocyanate group-containing compounds obtained by reacting the above isocyanate compound in an excess amount and a low molecular weight active hydrogen compounds (e.g., ethylene glycol, propylene glycol, trimethylolpropane, glycerol, sorbitol, ethylenediamine, monoethanolamine, diethanolamine, triethanolamine etc.) or high molecular weight active hydrogen compounds such as polyesterpolyols, polyetherpolyols, polyamides and the like may be used in embodiments disclosed herein.

Other useful polyisocyanates include, but are not limited to 1,2-ethylenediisocyanate, 2,2,4- and 2,4,4-trimethyl-1,6-hexamethylenediisocyanate, 1,12-dodecandiisocyanate, omega, omega-diisocyanatodipropylether, cyclobutan-1,3-diisocyanate, cyclohexan-1,3- and 1,4-diisocyanate, 2,4- and 2,6-diisocyanato-1-methylcylcohexane, 3-isocyanatomethyl-3,5,5-trimethylcyclohexylisocyanate ("isophoronediisocyanate"), 2,5- and 3,5-bis-(isocyanatomethyl)-8-methyl-1,4-methano, decahydronaphthathalin, 1,5-, 2,5-, 1,6- and 2,6-bis-(isocyanatomethyl)-4,7-methanohexahydroindan, 1,5-, 2,5-, 1,6- and 2,6-bis-(isocyanato)-4,7-methanohexahydroindan, dicyclohexyl-2,4'- and -4,4'-diisocyanate, omega, omega-diisocyanato-1,4-diethylbenzene, 1,3- and 1,4-phenylenediisocyanate, 4,4'-diisocyanatodiphenyl, 4,4'-diisocyanato-3,3'-dichlorodiphenyl, 4,4'-diisocyanato-3,3'methoxydiphenyl, 4,4'-diisocyanato-3,3'-diphenyl-diphenyl, naphthalene-1,5-diisocyanate, N—N'-(4,4'-dimethyl-3,3'-diisocyanatodiphenyl)-uretdion, 2,4,4'-triisocyanatano-diphenylether, 4,4',4''-triisocyanatotriphenylmethant, and tris(4-isocyanatophenyl)-thiophosphate.

Other suitable polyisocyanates may include: 1,8-octamethylenediisocyanate; 1,11-undecane-methylenediisocyanate; 1,12-dodecamethylendiisocyanate; 1-isocyanato-3-isocyanatomethyl-3,5,5-trimethylcyclohexane; 1-isocyanato-1-methyl-4(3)-isocyanatomethylcyclohexane; 1-isocyanato-2-isocyanatomethylcyclopentane; (4,4'- and/or 2,4'-) diisocyanato-dicyclohexylmethane; bis-(4-isocyanato-3-methylcyclohexyl)-methane; a,a,a',a'-tetramethyl-1,3- and/or -1,4-xylylenediisocyanate; 1,3- and/or 1,4-hexahydroxylylene-diisocyanate; 2,4- and/or 2,6-hexahydrotoluene-diisocyanate; 2,4- and/or 2,6-toluene-diisocyanate; 4,4'- and/or 2,4'-diphenylmethane-diisocyanate; n-isopropenyl-dimethylbenzyl-isocyanate; any double bond containing isocyanate; and any of their derivatives having urethane-, isocyanurate-, allophanate-, biuret-, uretdione-, and/or iminooxadiazindione groups.

Polyisocyanates may also include aliphatic compounds such as trimethylene, pentamethylene, 1,2-propylene, 1,2-butylene, 2,3-butylene, 1,3-butylene, ethylidene and butylidene diisocyanates, and substituted aromatic compounds such as dianisidine diisocyanate, 4,4'-diphenylether diisocyanate and chlorodiphenylene diisocyanate.

Other isocyanate compounds are described in, for example, U.S. Pat. Nos. 6,288,176, 5,559,064, 4,637,956, 4,870,141, 4,767,829, 5,108,458, 4,976,833, and 7,157,527, U.S. Patent Application Publication Nos. 20050187314, 20070023288, 20070009750, 20060281854, 20060148391, 20060122357, 20040236021, 20020028932, 20030194635, and 20030004282, each of which is hereby incorporated by reference. Isocyanates formed from polycarbamates are described in, for example, U.S. Pat. No. 5,453,536, hereby incorporated by reference herein. Carbonate isocyanates are described in, for example, U.S. Pat. No. 4,746,754, hereby incorporated by reference herein.

When it is desired to inject a silane-terminated polyurethane downhole, a polyol and polyisocyanate may be reacted together to provide an isocyanate-terminated polyurethane polymer with at least two urethane linkages in the polymer chain, and capping at least a portion of the isocyanate-terminated polymer with a silane having at least one alkoxy group to provide a moisture-curable silane-terminated polymer. These prepolymers having reactive silanol groups may form larger chains by condensation reaction and the loss of a byproduct of an alcohol or acetic acid as shown below in Eq. 1:

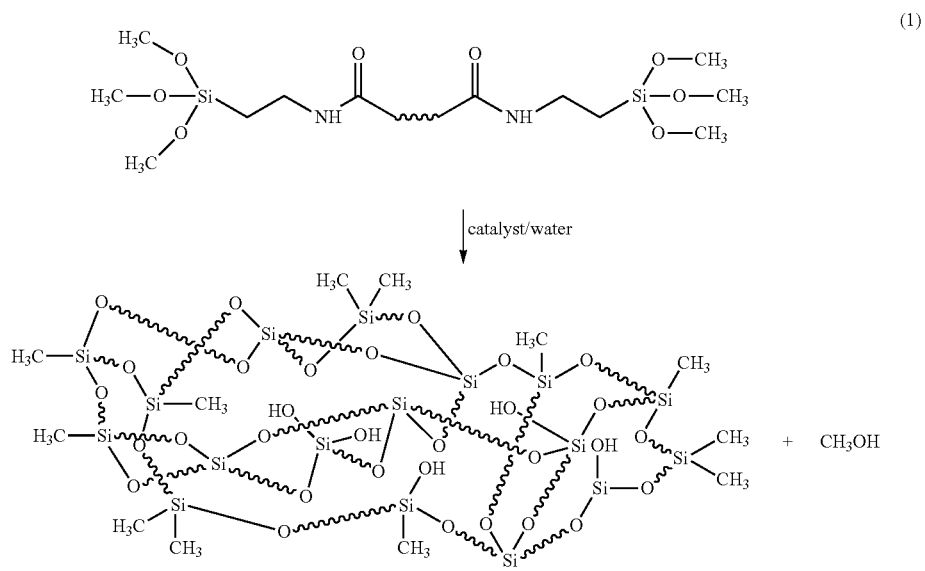

When it is desired to form the polyurethane downhole, the isocyanate and polyol components may be injected into the wellbore. However, in order to prevent premature reaction with the polyol, and thus gellation, or reaction with any water that may likely be present in the wellbore, the isocyanate pumped downhole for formation of an elastomeric gel may be a blocked isocyanate. Many isocyanate reactions are reversible, and this phenomenon allows obtaining blocked isocyanates, which regenerate the isocyanate function through heating. A generic reaction scheme for the isocyanate blocking, unblocking, and ultimate reaction with an active hydrogen compound is shown below in Eq. 2:

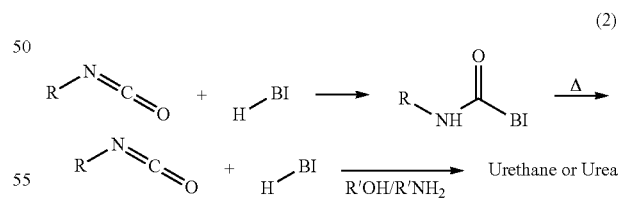

Blocked isocyanates are typically manufactured starting from acidic hydrogen-containing compounds such as phenol, ethyl acetoacetate and e-caprolactam. Typical unblock temperatures range between 90 to 200° C., depending on the isocyanate structure and blocking agent. For example, aromatic isocyanates are typically unblocked at lower temperatures than those required to unblock aliphatic isocyanates. The dissociation temperature decreases according to the following order of blocking agents: alcohols>lactams>phenols>oximes>pyrazoles>active methylene groups compounds. Products such as methylethylc-etoxime (MEKO), diethyl malonate (DEM) and 3,5-dimethylpyrazole (DMP) are typical blocking agents used, for example, by Baxenden Chemicals Limited (Accrington, England). DMP's unblock temperature is between 110-120° C., melting point is 106° C. and boiling point is high, 218° C., without film surface volatilization problems. Trixene prepolymers may include 3,5-dimethylpyrazole (DMP) blocked isocyanates, which may be commercially available from Baxenden Chemicals Limited.

Suitable isocyanate blocking agents may include alcohols, ethers, phenols, malonate esters, methylenes, acetoacetate esters, lactams, oximes, and ureas, among others. Other blocking agents for isocyanate groups include compounds such as bisulphites, and phenols, alcohols, lactams, oximes and active methylene compounds, each containing a sulfone group. Also, mercaptans, triazoles, pyrrazoles, secondary amines, and also malonic esters and acetylacetic acid esters may be used as a blocking agent. The blocking agent may include glycolic acid esters, acid amides, aromatic amines, imides, active methylene compounds, ureas, diaryl compounds, imidazoles, carbamic acid esters, or sulfites.

For example, phenolic blocking agent may include phenol, cresol, xylenol, chlorophenol, ethylphenol and the like. Lactam blocking agent may include gamma-pyrrolidone, laurinlactam, epsilon-caprolactam, delta-valerolactam, gamma-butyrolactam, beta-propiolactam and the like. Methylene blocking agent may include acetoacetic ester, ethyl acetoacetate, acetyl acetone and the like. Oxime blocking agents may include formamidoxime, acetaldoxime, acetoxime, methylethylketoxine, diacetylmonoxime, cyclohexanoxime and the like; mercaptan blocking agent such as butyl mercaptan, hexyl mercaptan, t-butyl mercaptan, thiophenol, methylthiophenol, ethylthiophenol and the like. Acid amide blocking agents may include acetic acid amide, benzamide and the like. Imide blocking agents may include succinimide, maleimide and the like. Amine blocking agents may include xylidine, aniline, butylamine, dibutylamine diisopropyl amine and benzyl-tert-butyl amine and the like. Imidazole blocking agents may include imidazole, 2-ethylimidazole and the like. Imine blocking agents may include ethyleneimine, propyleneimine and the like. Triazoles blocking agents may include compounds such as 1,2,4-triazole, 1,2,3-benzotriazole, 1,2,3-tolyl triazole and 4,5-diphenyl-1,2,3-triazole.

Alcohol blocking agents may include methanol, ethanol, propanol, butanol, amyl alcohol, ethylene glycol monomethyl ether, ethylene glycol monoethyl ether, ethylene glycol monobutyl ether, diethylene glycol monomethyl ether, propylene glycol monomethyl ether, benzyl alcohol, methyl glycolate, butyl glycolate, diacetone alcohol, methyl lactate, ethyl lactate and the like. Additionally, any suitable aliphatic, cycloaliphatic or aromatic alkyl monoalcohol may be used as a blocking agent in accordance with the present disclosure. For example, aliphatic alcohols, such as methyl, ethyl, chloroethyl, propyl, butyl, amyl, hexyl, heptyl, octyl, nonyl, 3,3,5-trimethylhexyl, decyl, and lauryl alcohols, and the like may be used. Suitable cycloaliphatic alcohols include, for example, cyclopentanol, cyclohexanol and the like, while aromatic-alkyl alcohols include phenylcarbinol, methylphenylcarbinol, and the like.

Examples of suitable dicarbonylmethane blocking agents include: malonic acid esters such as diethyl malonate, dimethyl malonate, di(iso)propyl malonate, di(iso)butyl malonate, di(iso)pentyl malonate, di(iso)hexyl malonate, di(iso)heptyl malonate, di(iso)octyl malonate, di(iso)nonyl malonate, di(iso)decyl malonate, alkoxyalkyl malonates, benzylmethyl malonate, di-tert-butyl malonate, ethyl-tert-butyl malonate, dibenzyl malonate; and acetylacetates such as methyl acetoacetate, ethyl acetoacetate, propyl acetoacetate, butyl acetoacetate and alkoxyalkylacetoacetates; cyanacetates such as cyanacetic acid ethylester; acetylacetone; 2,2-dimethyl-1,3-dioxane-4,6-dione; methyl trimethylsilyl malonate, ethyl trimethylsilyl malonate, and bis(trimethylsilyl) malonate.

Malonic or alkylmalonic acid esters derived from linear aliphatic, cycloaliphatic, and/or arylalkyl aliphatic alcohols may also be used. Such esters may be made by alcoholysis using any of the above-mentioned alcohols or any monoalcohol with any of the commercially available esters (e.g., diethylmalonate). For example, diethyl malonate may be reacted with 2-ethylhexanol to obtain the bis-(2-ethylhexyl)-malonate. It is also possible to use mixtures of alcohols to obtain the corresponding mixed malonic or alkylmalonic acid esters. Suitable alkylmalonic acid esters include: butyl malonic acid diethylester, diethyl ethyl malonate, diethyl butyl malonate, diethyl isopropyl malonate, diethyl phenyl malonate, diethyl n-propyl malonate, diethyl isopropyl malonate, dimethyl allyl malonate, diethyl chloromalonate, and dimethyl chloromalonate.

Other isocyanate blocking agents are described in, for example, U.S. Pat. Nos. 6,288,176, 5,559,064, 4,637,956, 4,870,141, 4,767,829, 5,108,458, 4,976,833, and 7,157,527, U.S. Patent Application Publication Nos. 20050187314, 20070023288, 20070009750, 20060281854, 20060148391, 20060122357, 20040236021, 20020028932, 20030194635, and 20030004282, each of which is incorporated herein by reference. Further, one of ordinary skill in the art would appreciate that mixtures of the above-listed isocyanate blocking agents may also be used.

In some embodiments, blocked polyisocyanate compounds may include, for example, polyisocyanates having at least two free isocyanate groups per molecule, where the isocyanate groups are blocked with an above-described isocyanate blocking agent. Blocked isocyanates may be prepared by reaction of one of the above-mentioned isocyanate compounds and a blocking agent by a conventionally known appropriate method.

In other embodiments, the blocked isocyanates used in embodiments disclosed herein may be any isocyanate where the isocyanate groups have been reacted with an isocyanate blocking compound so that the resultant capped isocyanate is stable to active hydrogens at room temperature but reactive with active hydrogens at elevated temperatures, such as between about 65° C. to 200° C. U.S. Pat. No. 4,148,772, for example, describes the reaction between polyisocyanates and capping agent, fully or partially capped isocyanates, and the reaction with or without the use of a catalyst, and is incorporated herein by reference.

Formed blocked polyisocyanate compounds are typically stable at room temperature. When heated, for example, to 70° C. or above in some embodiments, or to 120° C., 130° C., 140° C. or above in other embodiments, the blocking agent is dissociated to regenerate the free isocyanate groups, which may readily react with hydroxyl groups.

Polyurea Gels

In another embodiment, the gel may be a polyurea-based gel. Polyureas are, mechanistically similar to polyurethanes, produced by the polyaddition reaction of a polyisocyanate with a polyamine (instead of polyol). As stated above, a polyisocyanate is a molecule containing two or more isocyanate functional groups, $R-(N=C=O)_{n \geq 2}$, while a polyamine is a molecule having two or more amine functional groups, $R'-(NH_2)_{n \geq 2}$. The reaction product is a polymer containing the urea linkage, —RNHCNHR'—, formed by the reaction between an isocyanate group with an amine group. Typical isocyanate-containing compounds that may be reacted with polyamines to form a polyurea may include any of those compounds discussed above.

Aliphatic polyamines useful in preparing polyureas may have a molecular weight of 60 to 2000 and include monomeric and polymeric primary and secondary aliphatic amines having at least two amino groups. Examples include alkylene diamines such as ethylene diamine; 1,2-diaminopropane; 1,3-diaminopropane; 2,5-diamino-2,5-dimethylhexane; 1,11-diaminoundecane; 1,12-diaminododecane; piperazine, as well as other aliphatic polyamines such as polyethylenimines (PEI), which are ethylenediamine polymers and are commercially available under the trade name Lupasol® from BASF (Germany). PEIs may vary in degree of branching and therefore may vary in degree of crosslinking. LUPASOL® PEIs may be small molecular weight constructs such as LUPASOL® FG with an average molecular weight of 800 or large molecular weight constructs such as LUPASOL® SK with average molecular weight of 2,000,000. Cycloaliphatic diamines suitable for use may include those such as isophoronediamine; ethylenediamine; 1,2-propylenediamine; 1,3-propylenediamine; N-methyl-propylene-1,3-diamine; 1,6-hexamethylenediamine; 1,4-diaminocyclohexane; 1,3-diaminocyclohexane; N,N'-dimethylethylenediamine; and 4,4'-dicyclohexyl-methanediamine for example, in addition to aromatic diamines, such as 2,4-diaminotoluene; 2,6-diaminotoluene; 3,5-diethyl-2,4-diaminotoluene; and 3,5-diethyl-2,6-diaminotoluene for example; and primary, mono-, di-, tri- or tetraalkyl-substituted 4,4'-diamino-diphenylmethanes. Additionally, while many diamines are listed above, one of ordinary skill in the art would appreciate that tri- and tetraamines may also be used in other embodiments of the present disclosure.

In yet another embodiment the aliphatic amine may be a polyetheramine such as those commercially available under the trade name JEFFAMINE® Huntsman Performance Products (Woodlands, Tex.). For example, useful JEFFAMINE® products may include triamines JEFFAMINE® T-5000 and JEFFAMINE® T-3000 or diamines such as JEFFAMINE® D-400 and JEFFAMINE® D-2000. Useful polyetheramines may possess a repeating polyether backbone and may vary in molecular weight from about 200 to about 5000 g/mol. In addition, hydrazino compounds such as adipic dihydrazide or ethylene dihydrazine may be used, as may also, alkanolamines such as ethanolamine, diethanolamine, and tris(hydroxyethy)ethylenediamine.

Further, one of ordinary skill in the art would appreciate that, in various embodiments, it may be desirable to possess additional control over the curing reaction to produce the elastomeric gel. Such control may be obtained, for example, by using less chemically reactive amine structures, such as secondary amines, amines immobilized in a molecular sieve, or other less reactive or "slower amines" that may be known in the art. Suitable secondary amines may include those supplied by Huntsman Performance Products (Woodlands, Tex.), under the JEFFAMINE® SD product family, such as JEFFAMINE® SD-401 and JEFFAMINE® SD-2001.

Other Gels

In other embodiments, the hydrolysable gel may be formed, for example, from curable liquid elastomers including polysulfides, modified polysulfides, polyethers, modified polyethers including silylated polyethers, silicone polymers, fluoroelastomers, polybutadienes, polyisoprenes, and polyesters. Curing may be achieved by the use of a crosslinking agent, a catalyst, or a combination thereof, which in some embodiments may provide the hydrolysable bond rendering the gel chemically degradable in accordance with the present disclosure. Thus, no limitation on particular classes of gels suitable for use in treating a formation is intended on the scope of the present disclosure. Rather, one skilled in the art would appreciate that the presence of hydrolysable bonds may, for example, be dependent on particular crosslinking agents used. In particular, it is envisioned that a liquid elastomer component, such as that of the type described in U.S. Patent Application No. 60/914,604, which does not necessarily contain a hydrolysable bond, may be reacted with a curing agent to form a gel having a hydrolysable bond. Moreover, it is also envisioned that other gelling components not described in U.S. Patent Application Nos. 60/914,604 and 60/942,346 may be used in accordance with embodiments of the present disclosure.

In one embodiment, a liquid elastomer composition is contacted with at least one crosslinking agent in order to effect the formation of a non-aqueous gel. In general, the crosslinking agent may be any nucleophilic or electrophilic group that may react with the reactive groups available in the liquid elastomer. In a further embodiment, the crosslinking agent may comprise a polyfunctional molecule with more than one reactive group. Such reactive groups may include for example, amines, alcohols, phenols, thiols, carbanions, organofunctional silanes, and carboxylates.

Gel Properties

The hardness of the gel is the force necessary to break the gel structure, which may be quantified by measuring the force required for a needle to penetrate the crosslinked structure. Hardness is a measure of the ability of the gel to resist to an established degree the penetration of a test needle driven into the sample at a constant speed.

Hardness may be measured by using a Brookfield QTS-25 Texture Analysis Instrument. This instrument consists of a probe of changeable design that is connected to a load cell. The probe may be driven into a test sample at specific speeds or loads to measure the following parameters or properties of a sample: springiness, adhesiveness, curing, breaking strength, fracturability, peel strength, hardness, cohesiveness, relaxation, recovery, tensile strength burst point, and spreadability. The hardness may be measured by driving a 2.5 mm diameter, cylindrical, flat faced probe into the gel sample at a constant speed of 30 mm per minute. When the probe is in contact with the gel, a force is applied to the probe due to the resistance of the gel structure until it fails, which is recorded via the load cell and computer software. As the probe travels through the sample, the force on the probe and the depth of penetration are measured. The force on the probe may be recorded at various depths of penetration, such as 20, 25, and 30 mm, providing an indication of the gel's overall hardness. For example, the initial peak force may be recorded at the point the gel first fails, close to the contact point, followed by recording highest and lowest values measured after this point where the probe is travelling through the bulk of the gel.

In some embodiments, gel of the present disclosure may have a hardness value from 2 to 20000 gram-force. In other embodiments, the resulting gel may be a soft elastic gel having a hardness value in the range from 2 to 20 gram-force. In other embodiments, the resulting gel may be a firm gel having a hardness value from 20 to 100 gram-force. In other embodiments, the resulting gel may range from hard to tough, having a hardness value from 100 to 20000 gram-force; from 300 to 15000 gram-force in other embodiments; from 500 to 10000 gram-force in yet other embodiments; from 1000 to 9000 gram-force in yet other embodiments.

In other embodiments, the hardness of the gel may vary with the depth of penetration. For example, the gel may have a hardness of 300 gram-force or greater at a penetration depth of 20 mm in some embodiments. In other embodiments, the gel may have a hardness of 1000 gram-force or greater at a penetration depth of 20 mm; 3,000 gram-force or greater at a penetration depth of 20 mm in other embodiments; and 5000 gram-force or greater at a penetration depth of 25 mm in yet other embodiments.

With respect to the variables listed above (i.e. temperature, time, etc.), those having ordinary skill in light of the disclosure will appreciate that, by using the present disclosure as a guide, properties may be tailored as desired.

Viscosity

The viscosity of the gel composition may be affected by the concentrations of one or more of the gelling agent, viscosifier, and solids present in the composition. As the concentrations of the gelling agent, viscosifier, or solids increase, the viscosity of the gel composition will increase. In some embodiments, the concentration of the gelling agent may range from 8-25% by weight. In other embodiments, the concentration of the gelling agent may range from 10-20% by weight. In yet other embodiments, the concentration of the gelling agent may range from 11-17%.

Viscosity may be measured by using a Brookfield DV –II+ Viscometer. One of skill in the art will appreciate that the viscosity measurements will be dependent upon the temperature of the gel composition, the type of spindle, and the number of revolutions per minute. The viscosity ranges disclosed herein were measured at 20° C. using a Brookfield DV –II+ Viscometer with a LV2 spindle. The viscosity may be measured by lowering the viscometer into the center of the sample until the spindle is immersed the middle of the immersion mark. Care should be taken not to trap air under the spindle. The viscometer can be started after adjusting the viscometer to the desired RPM. If more than one RPM is to be used, the viscometer should be started at the lowest desired RPM. This reduces the amount of shear introduced to the sample, resulting in more accurate readings at lower RPM's.

In some embodiments, the mixing of the gelling agent and the crosslinking agent may produce gel compositions having an initial viscosity ranging from approximately 500 centipoise to 20,000 centipoise measured at 20° C. using an LV2 spindle at low rotational speeds (12 rpm or less). In other embodiments, the mixing of the gelling agent and the crosslinking agent may produce gel compositions having an initial viscosity ranging from approximately 1000 centipoise to 5,000 centipoise measured at 20° C. using an LV2 spindle at low rotational speeds (12 rpm or less). As used herein, initial viscosity refers to the viscosity of the composition prior to substantial reaction of the crosslinking agent and gelling agent.

Break Through Pressure

The break through pressure of the gel may also show the sealing properties of the gels. Break through pressure may be measured using a Permeability Plugging Apparatus. One of skill in the art will appreciate that the break through pressure measurements will be dependent upon the temperature of the gel composition, setting time, etc. The break through pressure may be measured by pumping and allowing the gels to set/age for a sufficient period of time on a porous substrate, such as a ceramic disk or sandstone core followed by testing the application of pressure to the substrate containing the gel therein. For example, the gelled substrate may be placed in a test apparatus with a solution adjacent the substrate. Pressure on the solution may be increased, and the pressure at which the solution begins to flow through the disc (if any) may be recorded as the breakthrough pressure. Gels of the present disclosure may, in some embodiments, possess a break through pressure of greater than 1000 psi.

Breaking of Gel

Breaker fluids that may chemically degrade the gels of the present disclosure may include hydrolyzing agent breaker fluids containing for example a base fluid and a hydrolyzing agent. Suitable hydrolyzing agents may include any acidic or alkaline compounds capable of hydrolyzing hydrolysable bonds within the non-aqueous gel under normal hydrolysis conditions. Illustrative examples of such acids include mineral acids, such as hydrochloric acid, hydrobromic acid, nitric acid, sulfuric acid, phosphoric acid and mixtures of these, organic acids such as carboxylic acids such as formic and acetic acid. However, one skilled in the art would appreciate that other acids, such as hypochlorous acid (or compounds releasing hypochlorous acid) may alternatively be used. Examples of such bases (or alkaline releasing compounds) include, for example, alkali metal or alkaline earth hydroxides, such as sodium hydroxide, potassium hydroxide, cesium hydroxide, and calcium hydroxide, and alkali metal or alkaline earth oxides such as sodium oxide, potassium oxide, calcium oxide, magnesium oxide, etc, alkali metal or alkaline earth carbonates or silicates such as sodium and potassium carbonate or silicate, various inorganic peroxides, which first decompose into a metal hydroxide and hydrogen peroxide, prior to the decomposition of hydrogen peroxide into oxygen and water, and organic amines, including alkyl amines such as mono-, bi-, or tri-alkylamines, where the alkyl groups may be any combination of methyl, ethyl, propyl, and isopropyl groups, alkanolamines, polyalkanolamines, and polyamines. Further, one of ordinary skill in the art would appreciate that this list is only illustrative of acids and bases suitable for use as a hydrolyzing agent and is in no way exhaustive of the particular compounds that may alternatively be used. Suitable amounts of the hydrolyzing agent may range up to 15 percent by weight, and from about 2 to 10 percent by weight in other embodiments. In some embodiments, the hydrolyzing agent may be present in an aqueous phase.

However, for the hydrolyzing agent to access hydrolysable bonds of the gel sufficient to cause degradation of the gel (such as interior hydrolysable bonds), it may be necessary to provide a swelling agent to expand the gelatinous structure, and provide the hydrolyzing agent with access to the hydrolysable bonds of the gel. Such swelling agents may include organic solvents known in the art that can penetrate into a non-aqueous gelatinous structure and expand or swell the gel. In a particular embodiment, such swelling agents may include polar (or slightly polar) solvents or mutual solvents, such as various alcohols and ethers. As used herein, the term mutual solvent refers to its ordinary meaning as recognized by those skilled in the art, as having solubility in both aqueous and oleaginous fluids. Thus, use of a polar or mutual solvent may allow for water to enter the internal structure of the non-aqueous gel so that hydrolysis of internal bonds may occur. Illustrative examples of such solvents include for example, isopropanol, diethylene glycol monoethyl ether, dipropylene glycol monomethyl ether, tripropylene butyl ether, dipropylene glycol butyl ether, diethylene glycol butyl ether, butylcarbitol, dipropylene glycol methylether, various esters, such as ethyl lactate, propylene carbonate, butylene carbonate, etc, and pyrolidones.

In an alternative embodiment, the hydrolyzing agent may be provided internal to the gel structure so that the hydrolyzing agent has access to the hydrolysable bonds of the gel upon desired degradation of the gel. However, so that premature degradation of the gels does not occur, certain embodiments of the present disclosure may use hydrolyzing agents that have been encapsulated, which may optionally be emplaced downhole in the gelling or gel-forming fluid as an internal oxidant. The use of capsules for the slow or controlled release of liquid or solid active ingredient and for the protection of the active ingredient from any interactions with the exterior medium is well known in the art. For example, use of encapsulated oxidants is described in U.S. Pat. No. 6,861,394, which is assigned to the present assignee and herein incorporated by reference in its entirety. Typically, capsules may be formed by physical methods such as spray coating, spray drying, pan coating, rotary disk atomization and the like; and chemical methods such as phase separation, interfacial polymerization and the like. Generally, release rates and solubility of the capsules are governed by the encapsulating material, capsule particle size, the thickness of the wall, the permeability of the wall, as well as external environmental triggers.

For the purposes of the present disclosure, an encapsulated oxidative breaker is an oxidant that has a coating sufficient to control the release of oxidant until a set of conditions selected by the operator occurs. Some general encapsulating materials may include natural and synthetic oils, natural and synthetic polymers and enteric polymers and mixtures thereof. However, many methods of encapsulating may alternatively be used without departing from the scope of the present disclosure. Further, other internal hydrolyzing agents may include solid hydrolyzing agents, such as calcium oxide, magnesium or calcium peroxide, which or may not be encapsulated. Thus, where an internal oxidant is used in the gelling fluid, after the gelling fluid is placed downhole and gels, the internal hydrolyzing agent may be triggered to begin degrading the gel.

Many methods may be used to cause the release of the hydrolyzing agent upon the occurrence of specific conditions desired by the operator. For example, the hydrolyzing agent could be caused to be released by a change in temperature, pressure, pH, abrasion or any number of these or other environmental factors, chemical exposure, change in salinity, ion concentration, pressure, etc. In a particular embodiment, the method by which the hydrolyzing agent is released from the encapsulating material for the purposes of degrading a gel in a subterranean well is by having the hydrolyzing agent release upon a change in pH in the down hole environment.

When using encapsulated hydrolyzing agents, a suitable coating polymer should preferably form a film around the hydrolyzing agent, and may be chosen such that the coating will remain substantially intact until the desired release conditions occur, for example, a change in pH. In a particular embodiment, the encapsulating material includes enteric polymers, which are defined for the purposes of the present disclosure, as polymers whose solubility characteristics are pH dependent. Here, this means that hydrolyzing agent release is promoted by a change from conditions of a first predetermined pH value to a second predetermined pH condition.

Enteric polymers are commonly used in the pharmaceutical industry for the controlled release of drugs and other pharmaceutical agents over time. The use of enteric polymers allows for the controlled release of the oxidative breaker under predetermined conditions of pH or pH and temperature. For example the Glascol family of polymers are acrylic based polymers (available form Ciba Specialty Chemicals) are considered suitable enteric polymers for the present disclosure because the solubility depends upon the pH of the solution. Further, while U.S. Pat. No. 6,861,394, which is assigned to the present assignee and herein incorporated by reference in its entirety, describes the use of encapsulated oxidants, one of ordinary skill in the art would appreciate that such encapsulating materials may similarly be used with the hydrolyzing agents of the present disclosure.

Further, use of such encapsulating materials may also be applied to swelling agents, alone or in combination with encapsulated hydrolyzing agents. Use of such encapsulated materials may be particularly useful when delay/controllability of the degradation of the non-aqueous gels is desired.

Applications

Embodiments of the gels disclosed herein may possess greater flexibility in their use in wellbore and oilfield applications. For example, the chemically degradable gels may be used in applications including: zonal isolation in enhanced oil recovery (EOR); loss circulation; wellbore (WB) strengthening treatments; reservoir applications such as in controlling the permeability of the formation, etc. By having means for chemically degrading the gels described herein, once the gel is formed downhole, it may be removed following use or removed in the case of misplacement by the operator. Thus, in various embodiments, a gel of the present disclosure may be emplaced in a region of a wellbore or formation, allowed to gel, and then the gel may be removed using the breaker fluids or internal breakers disclosed herein, due to misplacement of the gel or cessation of the need for the gel.

Upon desired removal of a non-aqueous gel from its location within a wellbore or formation where it may have been emplaced to perform any number of functions, the non-aqueous gel may be degraded via hydrolysis of its hydrolysable bonds by a hydrolyzing agent. Such hydrolyzing agent may access internal hydrolysable bonds, such as by the pre-placement of a swelling agent that may penetrate and expand or swell the gelatinous structure of the gel and/or the use of an internal hydrolyzing agent. Following such degradation, the wellbore may optionally be washed using wash fluids known in the art and/or various downhole operations may be continued.

EXAMPLES

Example 1

A non-aqueous gel was prepared by blending in each component until homogenous 15 mL of a SPUR 1050MM resin (silylated polyurethane) available from Momentive Performance Materials (Winton, Conn.) in 15 mL of a C16-18 internal olefin base oil, 0.3 g of AEROSIL® R-972, a fumed silica filler available from Evonik Industries (Essen, Germany), 5 mL of octyltriethylsilane, 0.3 mL VX-225, an aminosilane available from Momentive Performance Materials, and 2.1 mL of a 2.5:1 triisopropylamine:ethylene glycol blend. The components were placed in a hot roller at 150° F. for approximately 15 minutes to allow sample to warm, and then placed in an oven at 170° F. until set.

Gels samples (~1 cm$^3$ pieces) were subjected to various breaker fluids, and the time required to break down was recorded for each breaker fluid. The results are shown below in Table 1.

TABLE 1

| Sample No. | Breaker Solution | Time Required to Break Down (min) | |
|---|---|---|---|
| | | Broken at 120° F. | Broken at 170° F. |
| 1 | BLANK-100% ESCAID 110 | Not | Not |
| 2 | BLANK-100% IO 16/18 | Not | Not |
| 3 | BLANK-100% $H_2O$ | Not | Not |
| 4 | 47.5% ESCAID 110-47.5% IPA-5% KOH | 180 | 90 |
| 5 | 90% IPA-10% KOH | 150 | 75 |
| 6 | 47.5% IO 16/18-47.5% IPA-5% KOH | 195 | 90 |
| 7 | 90% Diethyleneglycolmonoethylether-10% KOH | 405 (85%) | 195 |
| 8 | 90% Dipropyleneglycolmonomethylether-10% KOH | 405 (90%) | 105 |
| 9 | 90% Tripropylenebutylether-10% KOH | 450 (50%) | 360 |
| 10 | 90% Butoxytriglycol-10% KOH | 450 (50%) | 360 |
| 11 | 90% Surfadone LP 100-10% KOH | Not | Not |
| 12 | 90% M-Pyrol-10% KOH | 450 | 300 |
| 13 | 90% Di(propylene glycol) butyl ether-10% KOH | 360 (50%) | 210 |
| 14 | 90% Diethylene glycol butyl ether-10% KOH | 360 (50%) | 315 |
| 15 | 90% $H_2O$-10% KOH | Not | — |
| 16 | 90% IPA-10% Triethylamine | Not | — |
| 17 | 100% IPA | Not | — |

Example 2

Non-aqueous gels were prepared as described in Example 1, with the use of ESCAID 110 for the C16-18 internal olefin base oil. Gels samples (~1 cm³ pieces) were subjected to various breaker fluids, and the time required to break down was recorded for each breaker fluid. The results are shown below in Table 2.

TABLE 2

| Sample No. | Breaker Solution | TIME REQUIRED TO BREAK DOWN (mins.) | |
|---|---|---|---|
| | | (@ 120° F.) | (@ 170° F.) |
| 1 | BLANK 100% ESCAID 110 | Not | Not |
| 2 | BLANK 100% IO 16/18 | Not | Not |
| 3 | BLANK 100% $H_2O$ | Not | Not |
| 4 | 47.5% ESCAID 110-47.5% ISOPROPANOL-5% KOH | 120 | 75 |
| 5 | 90% ISOPROPANOL-10% KOH | 135 | 90 |
| 6 | 47.5% IO 16/18-47.5% ISOPROPANOL-5% KOH | 135 | 90 |
| 7 | 90% DIETHYLENEGLYCOLMONOETHYLETHER-10% KOH | 405 (90%) | 165 |
| 8 | 90% DIPROPYLENEGLYCOLMONOMETHYLETHER-10% KOH | 405 (60%) | 105 |
| 9 | 90% Tripropylenebutylether-10% KOH | 450 (75%) | 240 |
| 10 | 90% Butoxytriglycol-10% KOH | 450 (50%) | 300 |
| 11 | 90% Surfadone LP 100-10% KOH | Not | Not |
| 12 | 90% M-Pyrol-10% KOH | 450 | 300 |
| 13 | 90% Di(propylene glycol) butyl ether-10% KOH | 360 (50%) | 195 |
| 14 | 90% Diethylene glycol butyl ether-10% KOH | 360 (50%) | 270 |
| 15 | 90% $H_2O$-10% KOH | Not | — |
| 16 | 90% IPA-10% Triethylamine | Not | — |
| 17 | 100% IPA | Not | — |

Advantageously, embodiments of the present disclosure for non-aqueous gels that may be removed following placement in a formation. In particular, by applying a hydrolyzing agent, the gel may be removed. Thus, the combination allows for a gel system that possesses stability with respect to temperature, pH, and pressure changes that may be easily removed upon application of the hydrolyzing breaker fluid disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:

1. A method of treating a formation, comprising:
    emplacing gel components within the formation to form a hydrolysable gel therein;
    exposing a region of the formation occupied by the hydrolysable gel to a hydrolyzing agent;
    after emplacing the gel components and the formation of the hydrolysable gel, then emplacing a swelling agent into the region of the formation occupied by the hydrolysable gel, wherein the swelling agent is one or more selected from the group consisting of alcohols, ethers, and pyrrolidones;
    allowing the swelling agent to expand the hydrolysable gel structure; and allowing sufficient time for the hydrolyzing agent to hydrolyze the hydrolysable gel;

wherein the swelling agent is emplaced into the region of the formation occupied by the hydrolysable gel after the hydrolysable gel performs a function selected from zonal isolation, loss circulation, wellbore strengthening, or formation permeability control.

2. The method of claim 1, wherein the hydrolyzing agent comprises at least one alkali metal or alkaline earth metal of hydroxides, oxides, and peroxides.

3. The method of claim 1, wherein the hydrolyzing agent comprises at least one of hydrochloric acid, hydrobromic acid, nitric acid, sulfuric acid, phosphoric acid, formic acid, acetic acid, and mixtures thereof.

4. The method of claim 1, wherein the hydrolysable gel comprises at least one of a polyurethane, polyurea, and polyester.

5. The method of claim 1, further comprising:
emplacing gel components to form a second gel.

6. A method of treating a formation, comprising:
emplacing a gelling fluid comprising an internal hydrolyzing agent into the formation;
allowing the gelling fluid to form a gel in a region of the formation, wherein the gel comprises at least one of a polyurethane, polyurea, and polyester;
after the formation of the gel in a region of the formation, then contacting the gel with a swelling agent, wherein the swelling agent is one or more selected from the group consisting of alcohols, ethers, and pyrrolidones; and
activating the internal hydrolyzing agent to break the formed gel.

7. The method of claim 6, wherein the hydrolyzing agent comprises at least one alkali metal or alkaline earth metal of hydroxides, oxides, and peroxides.

8. The method of claim 6, wherein the hydrolyzing agent comprises at least one of hydrochloric acid, hydrobromic acid, nitric acid, sulfuric acid, phosphoric acid, formic acid, acetic acid, and mixtures thereof.

9. The method of claim 6, wherein the internal hydrolyzing agent comprises an encapsulated hydrolyzing agent.

10. The method of claim 6, further comprising:
emplacing gel components to form the gel.

11. The method of claim 6, further comprising:
emplacing gel components to form a second gel.

12. A method of treating a formation, comprising:
emplacing gel components within the formation to form a hydrolysable gel therein;
after emplacing the gel components and the formation of the hydrolysable gel, then emplacing a swelling agent into a region of the formation occupied by the hydrolysable gel, wherein the swelling agent is a mutual solvent and is emplaced into the region of the formation occupied by the hydrolysable gel only after the hydrolysable gel performs a function comprising zonal isolation, loss circulation, wellbore strengthening, or formation permeability control and the hydrolysable gel is one or more selected from the group consisting of polyurethanes, silylated polyurethanes, and polyureas;
allowing the gel structure to expand;
emplacing a hydrolyzing agent into the region of the formation occupied by the gel; and
allowing sufficient time for the hydrolyzing agent to hydrolyze the expanded gel.

13. The method of claim 12, wherein the hydrolyzing agent comprises at least one alkali metal or alkaline earth metal of hydroxides, oxides, and peroxides.

14. The method of claim 12, wherein the hydrolyzing agent comprises at least one of hydrochloric acid, hydrobromic acid, nitric acid, sulfuric acid, phosphoric acid, formic acid, acetic acid, and mixtures thereof.

15. The method of claim 12, wherein at least one of the swelling agent and hydrolyzing agent is encapsulated.

16. The method of claim 12, wherein the hydrolyzing agent is emplaced simultaneous with the placement of the gel.

17. The method of claim 12, further comprising:
emplacing gel components to form a second gel.

18. The method of claim 12, wherein the swelling agent is one or more selected from the group consisting of alcohols, ethers, and pyrrolidones.

19. A method of treating a formation, comprising:
emplacing gel components within the formation to form a hydrolysable gel therein;
exposing a region of the formation occupied by the hydrolysable gel to a hydrolyzing agent;
after emplacing the gel components and the formation of the hydrolysable gel, then emplacing a swelling agent into the region of the formation occupied by the hydrolysable gel, wherein the hydrolysable gel is one or more selected from the group consisting of polyurethanes, silylated polyurethanes, polyureas, and polyesters and wherein the swelling agent is one or more selected from the group consisting of alcohols, ethers, and pyrrolidones;
allowing the swelling agent to expand the hydrolysable gel structure; and
allowing sufficient time for the hydrolyzing agent to hydrolyze the hydrolysable gel.

20. The method of claim 19, wherein the hydrolyzing agent comprises at least one alkali metal or alkaline earth metal of hydroxides, oxides, and peroxides.

21. The method of claim 19, wherein the hydrolyzing agent comprises at least one of hydrochloric acid, hydrobromic acid, nitric acid, sulfuric acid, phosphoric acid, formic acid, acetic acid, and mixtures thereof.

22. The method of claim 19, further comprising:
emplacing gel components to form a second gel.

\* \* \* \* \*